US006954614B2

(12) United States Patent
Jespersen

(10) Patent No.: US 6,954,614 B2
(45) Date of Patent: Oct. 11, 2005

(54) WIDEBAND TRANSMISSION THROUGH NARROWBAND TRANSPONDER

(75) Inventor: Nils Vidar Jespersen, Leesburg, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 1024 days.

(21) Appl. No.: 09/728,921

(22) Filed: Dec. 1, 2000

(65) Prior Publication Data

US 2003/0236068 A1 Dec. 25, 2003

(51) Int. Cl.$^7$ .............................................. H04Q 7/185
(52) U.S. Cl. ...................... 455/13.3; 455/137; 455/273
(58) Field of Search ............................. 455/12.1, 13.1, 455/13.2, 13.3, 13.4, 427, 428, 429, 132, 137–139, 272, 275, 276.1

(56) References Cited

U.S. PATENT DOCUMENTS 5,642,358 A * 6/1997 Dent ...................... 455/13.3 X
6,408,164 B1 * 6/2002 Lazaris-Brunner et al. 455/12.1
6,449,244 B1 * 9/2002 Loseke ................... 455/12.1 X

* cited by examiner

Primary Examiner—Nay Maung
Assistant Examiner—Philip J Sobutka
(74) Attorney, Agent, or Firm—Duane Morris LLP

(57) ABSTRACT

A transponder system, which may be on a spacecraft, provides communications to and among user terminals for audio-bandwidth signals. The transponder includes a receiver for uplink signals, and a digital channelizer which separates the various independent uplinked signals. The separated uplinked signals are then grouped together with other signals destined for the same downlink beam, and routed to the corresponding beam input port of a beamformer. The beamformer, in turn, energizes or feeds those antenna elements which are required to form the desired antenna beam.

In order to provide a capability for handling signals having a bandwidth greater than that of the audio signals, as might be required for providing the capacity to handle Internet signals, for example, a wideband augmentation equipment (WAE) is coupled in such a manner as to bypass the digital channelizer, to thereby provide a wideband path through the system, bypassing the narrowband channelizer.

10 Claims, 4 Drawing Sheets

WIDEBAND TRANSMISSION THROUGH NARROWBAND TRANSPONDER

FIELD OF THE INVENTION

This invention relates to communications, and more particularly to communications of both wideband and narrowband signals over a communication path including a beamformer.

BACKGROUND OF THE INVENTION

Communications are very important in the modern world. Techniques for communication include public switched telephone systems (PSTNs) operating over land lines, and also include other types of terrestrial lines, such as microwave links and fiber optic buses. The increasing use of the Internet makes wideband communications more important. For many purposes, land-line communications are not suitable, as for example for communication to or with aircraft and ships at sea. For communications with such mobile stations, conventional ship-to-shore type long-wave systems are not satisfactory, in that they tend to be very narrow-band.

Communications satellites or transponders are coming into widespread use for communications with locations which are not served by land lines. Such communications systems include satellite-based mobile telephone systems. These systems include low-earth-orbit (LEO) systems, in which the satellite constellations provide low time latency because of the proximity of the communicating satellite to the earth's surface. LEO systems have not found favor, because of the complexity of the handover of signal among satellites, and because the large number of satellites required for complete coverage and system economics necessitated inexpensive, and therefore limited-capability satellites. These limited-capability satellites, in turn, have small-aperture antennas and relatively low-power transmitters. These, in turn limit the performance, and tend to make the user terminals or handsets bulky and expensive.

Geosynchronous communications satellites have the advantage of not requiring earth stations to track the spacecraft, since its position relative to a fixed location on the earth's surface remains fixed. Fewer geosynchronous spacecraft are required to provide broad coverage, but complete earth coverage is not possible, or is at least difficult. In an inclined orbit, more coverage is possible, but tracking is required. Geosynchronous orbits are, however, distant from the earth, and consequently require large-aperture antennas and relatively high transmitted power (EIRP) to provide reliable communications with earth stations and user terminals. Some geosynchronous systems, such as Echostar, are simple "bent-pipe" systems, in which the uplinked signal modulated onto a carrier is merely converted to a different carrier frequency and downlinked, with the change in frequency being for providing isolation between uplink and downlink. Other systems receive uplinked carrier signals modulated with digital signals representing independent information such as an individual mobile user conversation, and actually demodulate the independent signals to baseband and process the digital signals, as for example to regenerate the digital signals to obviate waveform degradation attributable to the uplink.

Improved communications systems are desired.

SUMMARY OF THE INVENTION

A communication spacecraft provides cellular communications among a plurality of user terminals and ground stations, by way of paths having a bandwidth generally suited for audio signals, and also provides communications among at least the ground stations by way of at least one path having a bandwidth at least five times greater than the bandwidth suitable for audio signals. The spacecraft includes a downlink antenna including a plurality of antenna elements, for receiving guided electromagnetic energy at a feed port of each of the antenna elements, and for radiating the energy in the form of unguided radiation. The spacecraft also includes an analog beamformer including a plurality of beam input ports and a plurality of elemental antenna ports, each of which is coupled to one of the antenna elements, for producing at least one independent beam of electromagnetic downlink radiation from guided energy applied to each of the beam input ports, so that plural downlink antenna beams are formed when signals are applied to a plurality of the beam input ports of the analog beamformer. A receiving arrangement receives unguided electromagnetic uplink radiation including at least one carrier, and at least transduces the unguided electromagnetic uplink radiation into guided electromagnetic energy on a plurality of separate paths. In some contexts, the receiving arrangement also downconverts the signal carrier frequency to a lower frequency or to baseband. A narrowband digital channelizer has individual channels. Each of the individual channels has a bandwidth suitable for audio signals. The channelizer includes a plurality of input ports and a plurality of output ports. At least some of the input ports of the digital channelizer are coupled by way of corresponding ones of the plurality of separate paths to the receiving arrangement. The digital channelizer receives the guided electromagnetic energy from a plurality of the separate paths, and extracts each of the independent narrowband signals from at least one carrier, to thereby produce separated independent narrowband signals on the plurality of output ports of the digital channelizer. A wideband channelizer has an individual channel bandwidth at least five times greater than that of an individual channel of the narrowband channelizer. The wideband channelizer is coupled to at least a portion of the receiving arrangement, for extracting at least one wideband signal from the carrier, to thereby produce separated independent wideband signals. A switching arrangement is coupled to the plurality of output ports of the narrowband channelizer and is also coupled to the wideband channelizer. The switching arrangement receives the independent narrowband signals and the wideband signals, and groups together those signals associated with each of the plural downlink antenna beams, to thereby produce combined signals grouped by beam. The combined signals grouped by beam may include any number of the wideband signals, including the number zero. Lastly, the spacecraft also includes a coupling arrangement coupled to the switching arrangement and to the corresponding beam input ports of the beamformer. This causes the beamformer and the downlink antenna to route each of the combined signals to the antenna beam for which it is destined.

A method according to another aspect of the invention is for transmitting wideband signals and at least some of a plurality of independent signals through an analog beamformer. Each of the independent signals has a bandwidth no greater than one-fifth of that of the wideband signals. The method includes the step of receiving unguided electromagnetic radiation including (a) a plurality of the independent signals having bandwidths suitable for audio use and (b) the wideband signals, to thereby produce guided electromagnetic energy signals representing combined wideband signals and narrowband independent channels. In one mode of this method, the plurality of independent signals is modulated onto a subcarrier which is, in turn, modulated onto a carrier. The method according to the aspect of the invention further includes the steps of channelizing the signals representing combined wideband signals and narrowband independent channels, to thereby extract separated independent narrowband signals, and of separately channelizing the signals representing combined wideband signals and narrowband independent channels, to thereby extract separated wideband signals. Those of the separated independent narrowband signals and the separated wideband signals which are associated or destined for transmission over the same antenna beam are combined so as to produce antenna beam signals. The antenna beam signals are beamformed to produce plural antenna element guided wave signals which, when combined "in space" produce the desired beams. The last step of the method according to this mode of the method is to couple each of the antenna element guided wave signals to the guided wave input port of one of the antenna elements of an antenna array, so that each one of the antenna element receives one, and only one, of the antenna element guided wave signals. In a particularly advantageous mode of the method according to the invention, the step of channelizing the signals representing combined wideband signals and narrowband independent channels includes the step of digitally channelizing the combined wideband and narrowband independent channels. In a further advantageous mode of the inventive method, the step of channelizing includes the step of limiting the bandwidth of each of the independent signals to a bandwidth suitable for carrying of intelligible audio, which in one version is a bandwidth of less than about 10 Khz.

DESCRIPTION OF THE INVENTION

Figure 3:
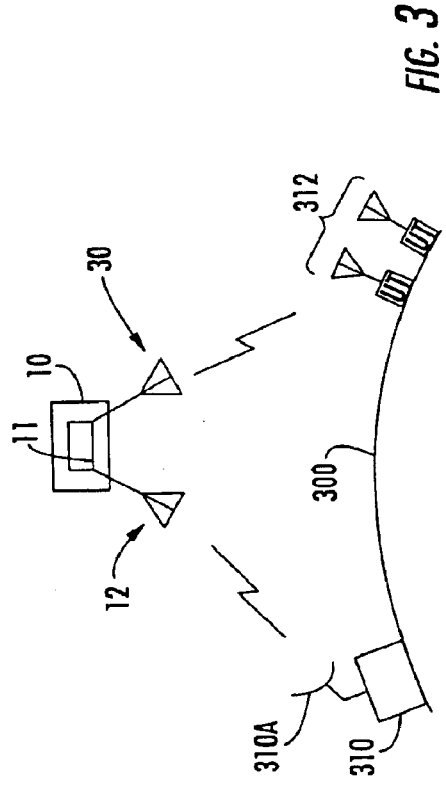
FIG. 3 is a simplified diagram of a spacecraft-based communication system in which the invention may be used.

FIG. 3 is a simplified block diagram of a spacecraft communication system 8. In FIG. 3, a spacecraft 10 includes an uplink antenna 12 and a downlink antenna 30. On the surface 300 of the Earth, a ground station 310 includes an antenna 310A by which ground station 310 communicates with the spacecraft 10. Also illustrated are a plurality of mobile user terminals (UT) illustrated together as 312. User terminals 312 communicate with other user terminals and with the ground station 310 by using the satellite's communication system 11 as a transponder.

Figure 1:
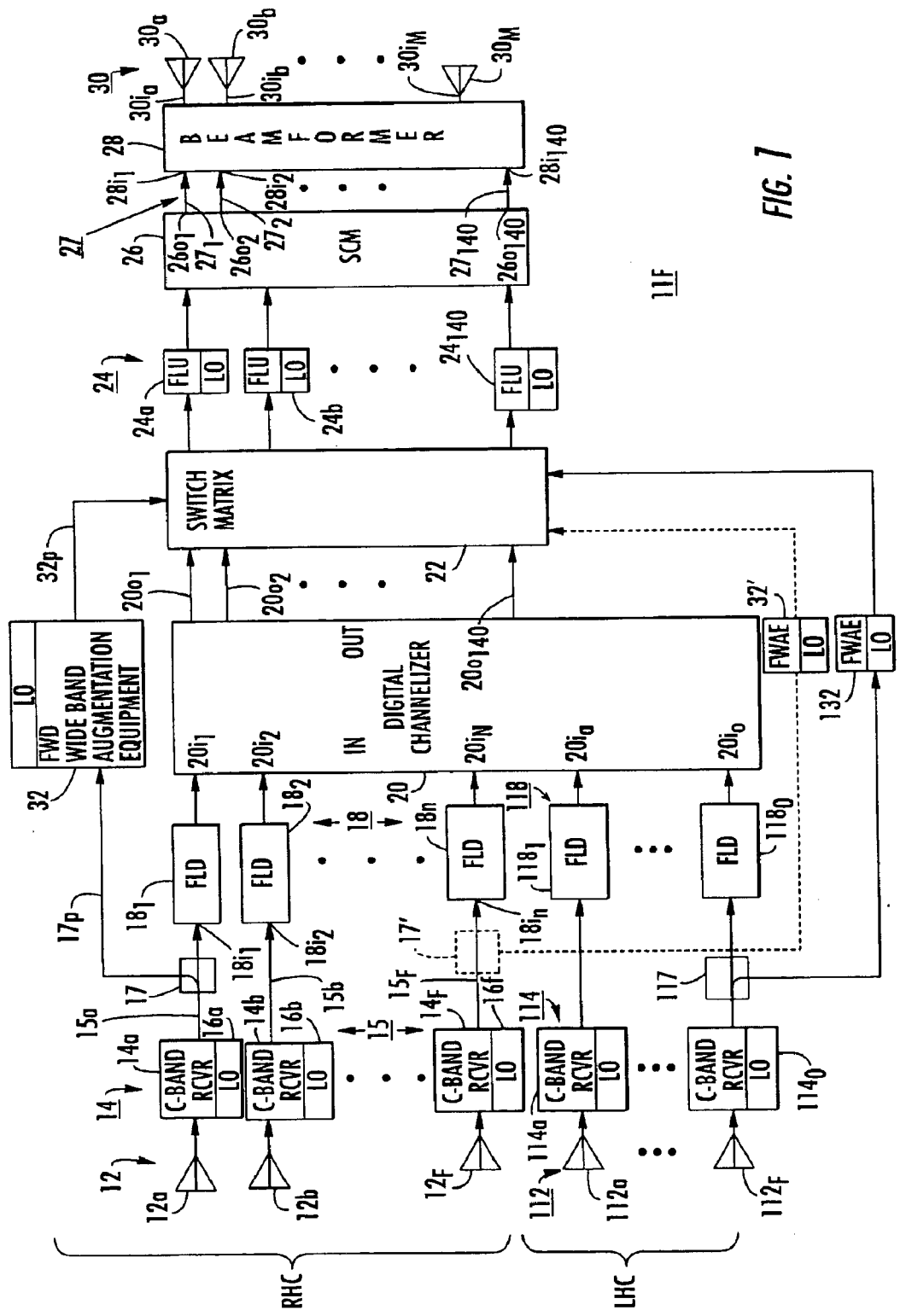
FIG. 1 is a simplified block diagram of a portion of a spacecraft including portions of the forward communication system.

In FIG. 1, a forward portion 11F of a spacecraft communication system 11 includes a set of antennas designated as 12, including antennas $12_a$, $12_b$, . . . , $12_F$. Antenna set 12 represents a set of uplink antennas on a spacecraft for receiving uplinked signals, as from an earth station. Antenna set 12 may be, for example, a high-gain antenna reflector pointed at an earth station or gateway in the context of a mobile station communications system, with individual feed antenna elements $12_a$, $12_b$, . . . , $12_F$. Uplinked signals are received by the antennas of set 12. More particularly, in the ACeS system, for example, the uplink signal includes plural C-band carriers, and each of the C-band carriers has a bandwidth of about 300 MHz, and is modulated with subcarriers spaced by a bandwidth. In the context of an ACeS system, the subcarrier spacing is about 200 KHz. Each subcarrier, in turn, may be modulated with a number of information signals, such as eight full-rate independent audio information signals (full rate meaning one time-division-multiplex (TDM) burst each frame) or thirty-two quarter-rate independent audio information signals (where quarter-rate means one TDM burst every four frames). In the case of ACeS, the independent TDM signals include cellular telephone signals. Each of the plural (eight or thirty-two) independent signals occupies the 200 KHz bandwidth of its subcarrier exclusively during its portion of the TDM interval or slot.

The signals received by each antenna of set 12 of FIG. 1 are applied to an associated C-band receiver of a set 14. More specifically, antenna $12_a$ is coupled to a C-band receiver (RCVR) $14_a$ and its associated local oscillator (LO) $16_a$, antenna $12_b$ is coupled to a C-band receiver (RCVR) $14_b$ and its associated local oscillator (LO) $16_b$, . . . , and antenna $12_F$ is coupled to a C-band receiver (RCVR) $14_F$ and its associated local oscillator (LO) $16_F$. Each C-band receiver $14_a$, $14_b$, . . . , $14_F$ of set 14 is an analog processing device which filters the received signals to reduce undesired out-of-band signals, and also receives intermediate-frequency (IF) signals from an associated synthesized or otherwise stable local oscillator of a set 16 of local oscillators. More particularly, a local oscillator $16_a$ is associated with receiver $14_a$, a local oscillator $16_b$ is associated with receiver $14_b$, . . . , and a local oscillator $16_F$ is associated with receiver $14_F$. Thus, there is, in principle, one receiver of set 14 for each antenna of set 12; the need for redundancy of active devices may, however, require additional or supernumerary receivers, and additional switching (not illustrated) for switching among the receivers. Each receiver of set 14 has an instantaneous bandwidth of about 30 MHz, may be tuned across the 300 MHz bandwidth of a C-band carrier, so as to allow any one of the receivers of set 14 to access any one signal, or any group of frequency-adjacent signals having a combined bandwidth of less than about 30 MHz. This tuning may be effectuated for any receiver of set 14 by tuning the IF signals from its associated local oscillator of set. Thus, the output bandwidth of any C-band receiver 14 represents any desired 30 MHz portion of the 300 MHz C-band bandwidth. Each receiver of set 14 downconverts its selected 30 MHz band to an intermediate frequency (IF). In the case of ACeS, the intermediate frequency is around 400 MHz.

The downconverted 30 MHz band associated with any particular receiver $14_a$, $14_b$, . . ., $14_F$ of set 14 is applied to a corresponding analog forward link downconverter. More particularly, the downconverted 30 MHz band of signals from receiver $14_a$ of FIG. 1 is applied to an analog forward link downconverter (FLD) block $18_1$, which represents downconversion from the IF frequency to baseband, the downconverted 30 MHz band of signals from receiver $14_b$ of FIG. 1 is applied to an analog forward link downconverter (FLD) block $18_2$, which represents downconversion from the IF frequency to baseband, . . . , and the downconverted 30 MHz band of signals from receiver $14_F$ is applied to an analog forward link downconverter block $18_F$. It should be understood that the number of FLD blocks equals the number of C-band receiver blocks in principle, but again the requirements for reliability redundancy may require more of one than of the other. Thus, each receiver of set 14 of receivers produces output signal having a bandwidth no greater than about 30 MHz, modulated onto an intermediate-frequency (IF) carrier. The signals produced at the output ports of the C-band receivers of set 14 are ultimately coupled to a block 20, which represents a digital channelizer. Because it is easier at the current state of the art to make a digital channelizer which operates at baseband rather than at an IF frequency, it is desirable to downconvert each of the IF-based signals, as produced by the C-band receivers of set 14, to baseband. Conversion to baseband of the IF-frequency signals produced at the output of each C-band receiver of set 14 is performed by a corresponding one of the forward link downconverters (FLDs) of a set 18. More particularly, a forward link downconverter $18_1$ is associated with C-band receiver $14_a$, a forward link downconverter $18_2$ is associated with C-band receiver $14_b$, . . . , and a forward link downconverter $18_F$ is associated with C-band receiver $14_F$. The only reason for the use of the set 18 of FLDs, then, is due to the economics of fabrication of the digital channelizer 20, and the combination of the downconverters of set 18 and the digital channelizer 20 may be considered to be simply a digital channelizer 21, since there is no requirement in principle for downconversion to baseband. As illustrated in FIG. 1, channelizer 20 has FLDs of set 18 coupled to its input ports $20i_1$, through $20i_N$. More particularly, channelizer 20 has its input port $20i_1$ coupled to receive signal from FLD $18_1$, its input port $20i_2$ coupled to receive signal from FLD $18_2$, . . . , and its input port $20i_N$ coupled to receive signal from FLD $18_N$. Channelizer 20 has about 140 active output ports in the ACeS version, and additional ports for redundancy/reliability and for additional capacity under certain circumstances. Thus, channelized digital signals are available at each of the output ports $20o_1, 20o_2, \ldots, 20o_{140}$ of channelizer 20, regardless of whether FLDs are used or not. The digital signals produced at each output port $20o_1, 20o_2, \ldots, 20o_{140}$ of channelizer 20 are in the form of digital signals modulated onto a baseband carrier, and each such modulated baseband carrier represents a plurality of independent digital signals, with each independent signal representing, for example, voice signal travelling in one direction to or from a mobile user terminal on the ground. In practice, channelizer 20 has an ultimate bandwidth of about 9 MHz per beam output port, which translates to about 45 subcarriers, corresponding to a maximum of 280 full-rate audio channels, or about a thousand quarter-rate audio channels per output port. It should be noted that each active output port $20o_1, 20o_2, \ldots, 20o_{140}$ represents one antenna beam, so if, as in the case of ACeS, there are 140 outputs from the digital channelizer, 140 separate antenna beams are intended.

The output ports of channelizer 20 of FIG. 1 are coupled to a switch matrix illustrated as 22. Switch matrix 22 is a digitally-controlled analog-signal-handling device, which couples the digital-modulated-onto-carrier signals from each output port $20o_1, 20o_2, \ldots, 20o_{140}$ of channelizer 20 to one of a set 24 of active forward link upconverters (FLUs), which are designated $24_a, 24_b, \ldots, 24_{140}$. The ACeS spacecraft uses about 140 active FLUs, and has a total of about 180 FLUs, with the inactive FLUs being spares for redundancy. Each FLU $24_a, 24_b, \ldots, 24_{140}$ of set 24, with the aid of an associated local oscillator (LO), upconverts the digital-modulated-onto-carrier combined independent signals applied thereto from an output port of channelizer 20. The frequency upconversion is to a downlink frequency, which in the case of ACeS happens to be at about 1500 MHz. The resulting upconverted signals (at a downlink frequency) produced at the output of each FLU of set 24 are coupled from the FLU to a corresponding input port of a switch combining matrix (SCM) 26. SCM 26 has a total of about 180 input ports, and about 140 output ports. Each of the 140 output ports of SCM 26 is coupled by way of a path of a coupling arrangement 27 to one of the beam input ports $28i_1, 28i_2, \ldots, 28i_{140}$ of a beamformer 28. More particularly, output port $26o_1$ of SCM 26 is coupled by way of signal path $27_1$ to input port $28i_1$ of beamformer 28, output port $26o_2$ of SCM 26 is coupled by way of signal path $27_2$ to input port $28i_2$ of beamformer 28, . . . , and output port $26o_{140}$ of SCM 26 is coupled by way of signal path $27_{140}$ to input port $28i_{140}$ of beamformer 28. SCM 26 is basically a switch matrix which allows the signals from any combination of 140 active FLUs to be coupled to a beam input port of beamformer 28, and which also allows the output signals of two or more FLUs to be coupled (through hybrids) to a single beam input port of the beamformer. The switching function allows failed FLUs to be replaced by functional FLUs, and the switching-plus-combining function also allows for additional functionality of increasing the beam capacity under circumstances where a particular antenna beam experiences particularly high traffic during a period of time. For purposes of understanding the principles of the invention, SCM 26 may be ignored.

In general, the signals from each FLU $24_a, 24_b, \ldots, 24_{140}$ of set 24 are applied to one corresponding beam input port $28_1, 28_2, \ldots, 28_{140}$ of beamformer 28. As known to those skilled in the art, the beamformer couples the signals applied to each beam input port $28_1, 28_2, \ldots, 28_{140}$ to the guided-electromagnetic-wave input ports $30i_a, 30i_b, \ldots, 30i_M$ those antenna elements $30_a, 30_b, \ldots, 30_M$ of antenna set 30 as necessary to form an antenna beam of the desired type and shape. In the ACeS system, there are about 140 spot beams. The independent signals destined for each beam are coupled from the beam input port of beamformer 28 to the corresponding downlink antenna beam, and in general not to the other beams.

As so far described, the structure of system 10 of FIG. 1 is a part of a system designated RHC, which stands for Right-Hand-Circular. This designation refers to the polarization of the uplink antenna set 12. As known to those skilled in the art, another set 112 of antennas, similar to set 12, but of the other hand of polarization, may be used in conjunction with set 12. This other hand of polarization is termed left-hand-circular (LHC). In principle, it is possible to use the same uplink frequencies with the other hand of orthogonal polarization in order to re-use the frequency band. Thus, independent signals can in principle be received by the set of antennas designated 112 in the LHC section of the system 10. Each antenna $112_a$ through $112_F$ of set 112 is coupled to a corresponding C-band receiver $114_a, \ldots, 114_o$ of a set 114 of C-band receivers. As in the case of the RHC portion of the system, the C-band receivers are coupled to FLDs $118_1, \ldots, 118_o$ of a set 118 of FLDs. The outputs of the FLDs of set 118 are applied individually to the input ports $20i_a, \ldots, 20i_o$ of digital channelizer 20. The various C-band receivers of set 114 and FLDs of set 118 perform in a manner equivalent to those of sets 14 and 18, with the only difference being in the signals handled, as the antennas of set 112 are capable of receiving signals of a different set from those received by antenna set 12.

According to an aspect of the invention, one or more wideband transmission paths is provided between the C-band receivers $14_a, 14_b, \ldots, 14N$ of set 14 and beamformer 28, so that wideband signals, such as Internet signals, can flow through the spacecraft portion of the communications link. More particularly, the wideband transmission path bypasses the narrowband part of the spacecraft communications channel, which is the digital channelizer 20. Since, as mentioned, the channelizer may be viewed as including the associated FLDs of set 18, the wideband transmission path can also be routed around or bypass the FLDs. In the arrangement of FIG. 1, a forward-direction wideband augmentation equipment (FWAE) 32 is illustrated as providing a path which bypasses FLD $18_1$ and digital channelizer 20. More particularly, the signal path between C-band receiver $14_a$ and FLD $18_1$ is illustrated as including a power splitter or signal bypass 17. FWAE 32 is illustrated as having it input port 32i coupled by way of a signal path 17p to an output port of splitter 17, for receiving a sample of the signal received by C-band receiver $14_a$. FWAE 32 processes the signal sample by at least downconverting the signal, with the aid of its own LO, to a frequency corresponding to that at the outputs $20o_1, 20o_2, \ldots, 20o_{140}$. The frequency-converted wideband signals produced at the output of FWAE 32 are coupled by way of a signal path 32p to an input of switch matrix 22, where the signals can be processed in a wideband manner. All locations downstream from switch matrix 22, namely the FLU set 24, the SCM 26, and the beamformer 28, are capable of wideband operation, so a path is provided by which broadband signals can be processed through a spacecraft fitted for mobile user terminal communications. This, in turn, allows a spacecraft fitted for mobile user terminal communications, which are ordinarily narrow-band, to handle wideband signals such as Internet communications.

The invention is not limited to providing a single wideband forward signal path through the spacecraft. As illustrated in FIG. 1, a further signal sampler 117 is illustrated as being coupled to the signal path extending between C-band receiver $114_a$ and FLD $118_a$. The sampled signal is illustrated as being coupled to a further forward wideband augmentation equipment 132, which processes the signals in its path in the same manner as those processed in FWAE 32, and applies the wideband signals so processed to another input port of switch matrix 22. In a similar manner, other FWAEs, such as 32', can be coupled to other signal samplers, such as 17', and to other input ports of switch matrix 22. It should be understood that, in general, wideband signals and narrowband signals should not appear at the same frequencies at the outputs of the various C-band receivers, but that, if such should occur, the signals in the overlap bands may be required not to appear in the same beams, as their presence in the same beams may be associated with different group delays and phases, and as such may interfere.

Figure 2:
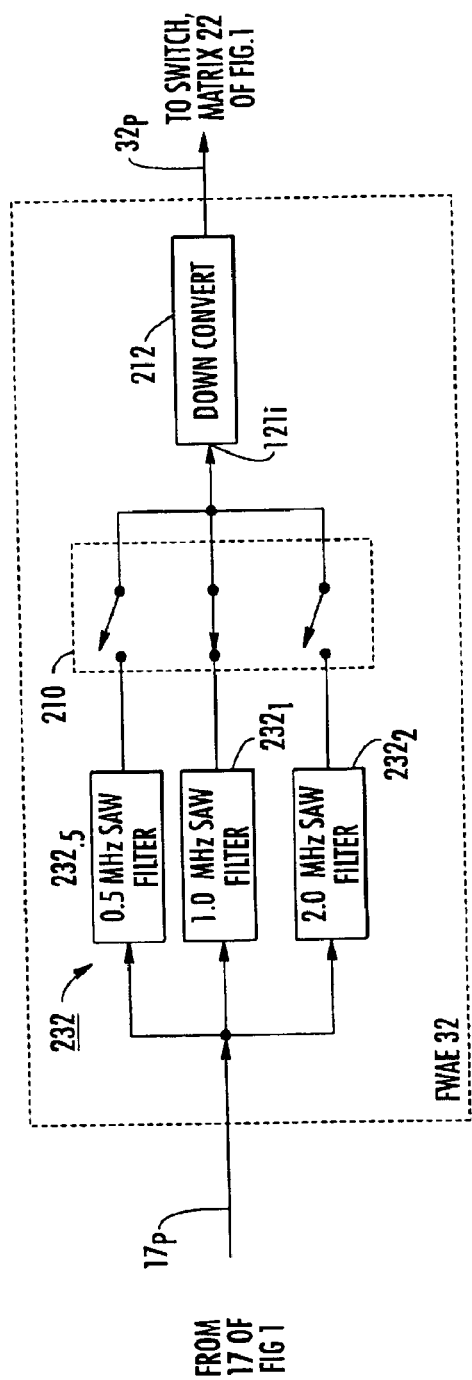
FIG. 2 is a simplified block diagram of a wideband portion of the structure of FIG. 1.

FIG. 2 is a simplified block diagram of one possible implementation of forward wideband augmentation equipment 32. In FIG. 2, elements corresponding to those of FIG. 1 are designated by the same reference numerals. In FIG. 2, the wideband RHC polarization, downconverted signal samples of the signal produced by C-band receiver $14_a$ of FIG. 1 are coupled over signal path 17p to FWAE 32. Within FWAE 32, the signals are applied in common or in parallel to a bank 232 of filters. While the number of filters may be almost arbitrarily selected, the illustrated arrangement includes three filters $232_{0.5}, 232_{1.0}$, and $232_{2.0}$, which have passbands with a width of 0.5, 1.0, and 2.0 MHz, respectively. Such filters are well known in the art, and require no further explanation. Because of their light weight, surface-acoustic-wave (SAW) filters are particularly advantageous for spacecraft use. Wideband signals with various bandwidths are available at the output ports of the filters of filter bank 232. The variously filtered signals are applied to a switch bank 210, illustrated as containing a bank of controllable switches, which allow the signals from one or more of the filters $232_{0.5}, 232_{1.0}$, and $232_{2.0}$ to be coupled to an input port 212i of a downconverter 212. The filter passbands can be so arranged that the total bandwidth of the filter bank can be summed. For example, when filter $232_{0.5}$ (which has a bandwidth of 0.5 MHz) is connected to the 212 downconverter via the 210 switch concurrently with filter $232_{1.0}$ (which has a bandwidth of 1.0 MHz), the total effective bandwidth of the filtering applied to the input of the 212 downconverter is the sum of 0.5 MHz and 1.0 MHz, or 1.5 Hz. The downconverter downconverts the selected wideband signal and makes it available on signal path 32p for application to an input port of switch matrix 22 of FIG. 1. The wideband signal is then propagated, together with narrowband signals from digital channelizer 20, through wideband portions of the structure of FIG. 1, including the switch matrix 22, FLU bank or set 24, SCM 26, and beamformer 28. Thus, the wideband signals can be routed to any of the antenna beams, just as the narrowband signals are routed.

Figure 4:
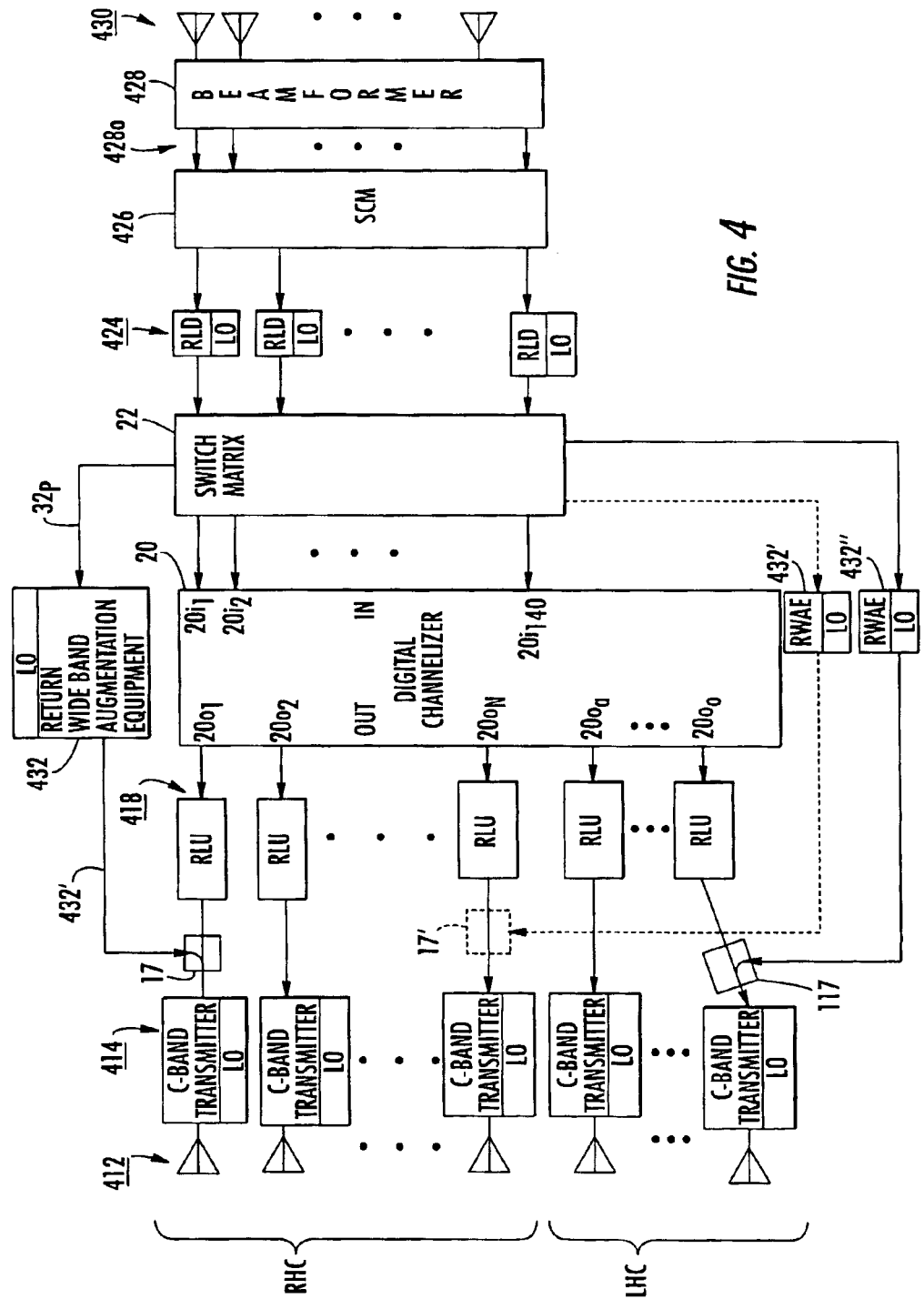
FIG. 4 is a simplified block diagram of a portion of a spacecraft including portions of the reverse communication system.

FIG. 4 is a simplified block diagram of a return or reverse portion 11R of the spacecraft 10 communication system. In FIG. 4, elements corresponding to those of FIG. 1 are designated by like reference numbers, and elements which are similar but not identical may be designated by the same reference numerals in the 400 series. In FIG. 4, an uplink receive antenna 430 receives uplink signals which may include both wideband and narrowband portions, but which are at L-band. The beamformer 428 is similar to beamformer 28 of FIG. 1, but is a separate and different unit because the antennas 30, 430 and the operating frequencies are different. The beamformer 428 forms the beams as described in conjunction with beamformer 28, and produces at its output port set 428o groups of signals representing the uplinked signals on each beam. These beam-grouped signals are applied to a switch combining matrix 426, which operates at a different frequency than does matrix 26 of FIG. 1. Switch combining matrix 426 performs redundancy switching of the return or reverse link downconverters (RLDs) of set 424 of RLDs. It also provides for channel capacity augmentation by routing or distributing "excess" signals in one uplink beam to or among the channelizer inputs. The return link downconverters of set 424 couple baseband signals, separated or maintained independent by the TDM switching, to the switch matrix 22, which can be identical to that of FIG. 1 because both operate at baseband. While it can be identical, it cannot be the self-same unit, because the routing of the signals in the forward direction is not the same as the routing in the reverse direction. The structure of switch matrix 22 is wideband, so there is no particular reason that wideband signals could not be routed to the input ports of channelizer, nor is there any reason that narrowband signals could not be routed to path 32p, although this would be undesirable, as the wideband signals if applied to a channelizer input port would be rendered narrowband and likely useless, and narrowband signals if applied to the wideband signal paths would not take advantage of the available bandwidth. ordinarily, the narrowband signals will be routed to the input ports $20i_1, 20i_2, \ldots, 20i_{140}$ of channelizer 20, and the wideband signals, if any are present, will be routed to the wideband augmentation equipment 432. In general, digital channelizer 20 of FIGS. 1 and 4 operate at baseband, and so can be structurally identical (although the self-same units cannot be used because the routing of signals in the forward and reverse directions differs). The wideband augmentation equipment 432 is similar, but not identical to, the corresponding equipment 32 of FIG. 1. The major difference between the two wideband augmentation equipments is that the forward-direction wideband augmentation equipment 32 receives input signals at about 400 MHz for proper operation of the SAW filters, and then downconverts to baseband, while the reverse-direction wideband augmentation equipment 432 of FIG. 4 receives baseband signals, and must upconvert the baseband signals to a range suitable for operation of the SAW filters.

Channelizer 20 of FIG. 4 produces narrowband signals destined for RHCP transmissions on a set $20o_1, 20o, \ldots, 20o_N$, which are grouped by gateway destination, are routed through a set 418 of return link upconverters (RLU), for conversion to an IF frequency in the range of 400 MHz. The upconverted signals at the outputs of RLUs of set 418 are applied to C-band transmitters of a set 414, which upconvert the IF signals to the C-band downlink frequencies, in the vicinity of 3.4 GHz. The transmit signals are applied from the C-band transmitters to the antenna elements of an antenna 412 which is different from antenna 12 of FIG. 1 because of operating frequencies, but is functionally identical.

Similarly, the narrowband output signals destined for the LHCP downlink are produced at output ports $20o_a, \ldots, 20o_o$ of channelizer 20 of FIG. 1, and are coupled to their respective reverse link upconverters of set 418, thence to the corresponding C-band transmitters of set 414 and on to the RHCP antennas. The wideband signals coupled through return wideband augmentation equipment 432 is applied through a signal sampler or directional coupler 17, which is identical to that of FIG. 1, to thereby couple the wideband signals to one of the C-band transmitters. The simplified illustration allows the wideband signals to be transmitted to only a few of the ground stations, but in an actual unit, a switch matrix might be used to route the wideband signals to any of the C-band transmitters of set 14, or a plurality of return wideband augmentation equipments corresponding to 432 could be provided, together with a signal sampler or directional coupler corresponding to 17 providing access to each of the C-band transmitters of set 414. Also in FIG. 4, switch matrix 22 couples wideband signals to additional return wideband augmentation equipments 432' and 432", which operate much like equipment 432, and which couple their wideband output signals to signal samplers or directional couplers 17' and 117, respectively.

Figure 5:
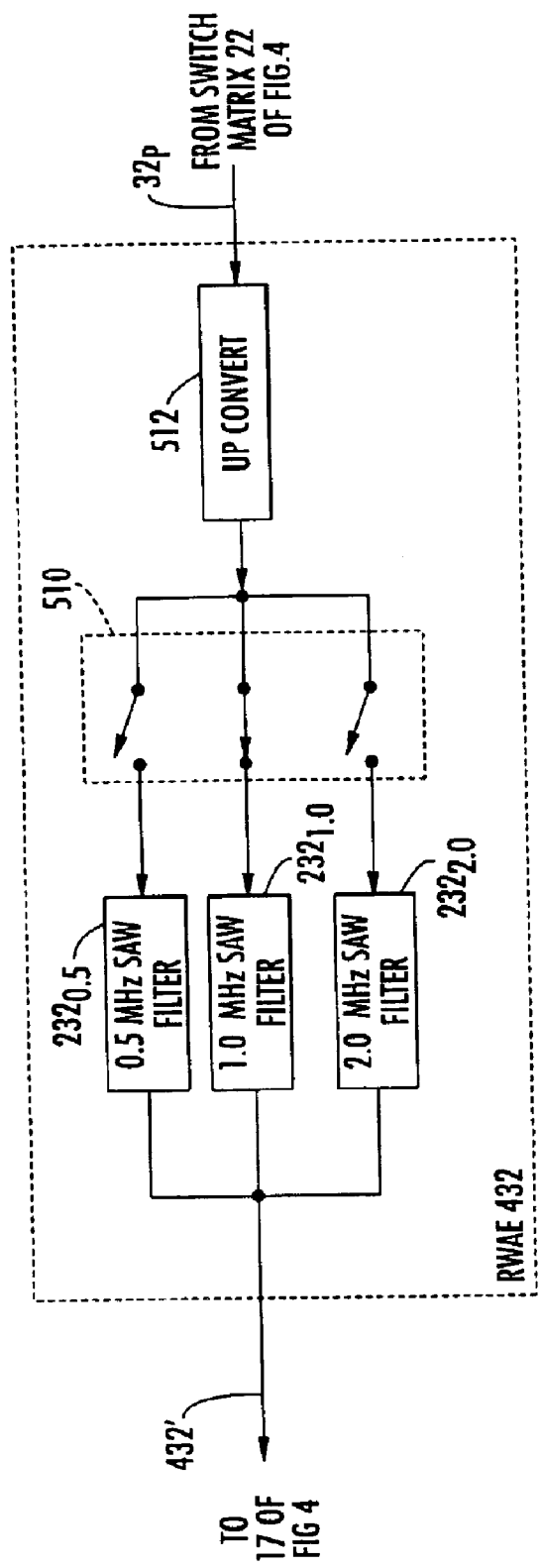
FIG. 5 is a simplified block diagram of a wideband portion of the structure of FIG. 4.

FIG. 5 is a simplified block diagram illustrating details of return wideband augmentation equipment 432 of FIG. 4. In FIG. 5, the wideband baseband signal from switch matrix 22 of FIG. 4 is applied over signal path 32P to an upconverter 512 of return wideband augmentation equipment 432. Upconverter 512 upconverts the signal to a frequency in the range of about 400 MHz, which is suitable for operation of SAW filters. The upconverted wideband return signal is applied to a common portion of a switch matrix illustrated as 510, which selects one of a plurality of possible signal paths for the upconverted return signal from upconverter 512. Each path selectable by switch matrix 510 leads to a SAW filter. As in the case of FIG. 2, the SAW filters are designated $232_{0.5}$, $232_{1.0}$, and $232_{2.0}$, which have passbands with a width of 0.5, 1.0, and 2.0 MHz, respectively. The return signal, filtered by the selected one or more of SAW filters $232_{0.5}$, $232_{1.0}$, and $232_{2.0}$, is coupled by way of signal path 432' to signal sampler or directional coupler 17 of FIG. 4. The filter passbands are so arranged that the total bandwidth of the filter bank can be summed. For example, when filter $232_{0.5}$ (which has a bandwidth of 0.5 MHz) is connected to the 512 upconverter via the 510 switch concurrently with filter $232_{1.0}$ (which has a bandwidth of 1.0 MHz), the total effective bandwidth of the filtering available at the output of the 512 upconverter is the sum of 0.5 MHz and 1.0 MHz, or 1.5 MHz. The other return wideband augmentation equipments of FIG. 4 are similar to return wideband augmentation equipment 432.

It is worth noting that an "antenna" as used herein refers to a transducer which transduces electromagnetic energy or power bidirectionally (in either direction) between unguided or free-space propagation and guided propagation in a transmission line. An antenna is a reciprocal device, which operates in the same manner in both transmission and reception modes of operation. For historical reasons, some of the terms used in antenna practice are not as descriptive as might be desirable. For example, the guided-wave port of an antenna is often called a "feed" port, regardless of whether the antenna is operated in a transmitting or receiving mode. Similarly, an antenna "beam" is relatively easy to understand conceptually when the antenna is operated in a transmitting mode, but the amplitude-versusangle characteristics of an antenna operating in the receive mode are the same as those of an antenna in the transmitting mode, and so the term "beam" is also associated with a receiving antenna, even though there is no conceptual beam involved. Those skilled in the antenna arts also realize that an antenna never exhibits perfect polarization purity, in that an antenna which is nominally RHC will respond to LHC signals, and vice versa, a "vertically" polarized signal need not be vertical in orientation nor "horizontally" polarized horizontal, and a linearly polarized antenna responds strongly to circularly polarized signals and vice versa.

The use of the term "between" as used in the description of antenna usage, and as used in electrical parlance, is different from the dictionary usage, and in no wise relates to physical location. Generally, the word "between" as used in electrical applications means that the origin of the signal or electrical fields is one of the stated locations or blocks, and the sink or destination of the signal (or fields) is the other one of the stated locations or blocks. The route taken by the signals (or fields) in flowing from source to destination is irrelevant in the electrical context. A similar distinction must be made for electrical usage for the term "parallel," which does not have to do with physical parallelism. Rather, "parallel" in an electrical context refers to the number or existence of multiple paths extending "between" a source and destination.

While switch symbols representing mechanical switch elements have been illustrated, those skilled in the art know that these are merely symbolic or conventional representations, and that in actual practice, mechanical switches are seldom used. Instead, the symbols represent the switching function rather than the device, and the switching function is ordinarily accomplished by semiconductor or solid-state switches, often remotely controllable or controlled.

Other embodiments of the invention will be apparent to those skilled in the art. While the particular described embodiment represents an ACeS system, the frequencies and bandwidths may be widely varied from the examples. For example, while the described system is at C-band, those skilled in the art will recognize that the invention is applicable to other frequency bands, including L, X, and K bands. Similarly, the various bandwidths of 300 MHZ, 30 MHz, 200 KHz, and the like may be almost arbitrarily selected, depending upon the characteristics of the system and of the signals being carried. While the antenna sets 12, 112 of FIG. 1 have been described as the feed antennas of a high-gain reflector element, they may also be viewed as the output ports of the beamformer of a receive antenna array making a single beam or multiple beams. While the described transponder is in a spacecraft, the transponder could as well be terrestrial. While the routing of the various narrowband and wideband signals has been described in FIG. 1 as being to an antenna beam, those skilled in the art know that a given signal may be routed to more than one antenna beam, and one or more signals may be routed in a "broadcast" mode so that they are transmitted over all the available antenna beams. While SAW filters have been described, other types of filters can be used if desired.

Thus, a communication spacecraft (10) provides cellular communications among a plurality of user terminals (312) and ground stations (310), by way of paths having a bandwidth generally suited for audio signals, and also provides communications among at least the ground stations (310) by way of at least one path having a bandwidth at least five times greater than the bandwidth suitable for audio signals. The spacecraft (10) comprises a downlink antenna (30) including a plurality of antenna elements ($30_a$, $30_b$, ..., $30_M$), for receiving guided electromagnetic energy at a feed port ($30i_a$, $30i_b$, ..., $30i_M$) of each of the antenna elements ($30_a$, $30_b$, ..., $30_M$), and for radiating the energy in the form of unguided radiation. The spacecraft also includes an analog beamformer (28) including a plurality of beam input ports ($28i_1$, $28i_2$, ..., $28i_{140}$) and a plurality of elemental antenna ports, each of which is coupled (by way of a corresponding antenna element feed port $30i_a$, $30i_b$, ..., $30i_M$) to one of the antenna elements ($30_a$, $30_b$, ..., $30_M$), for producing at least one independent beam of electromagnetic downlink radiation from guided energy applied to each of the beam input ports ($30i_a$, $30i_b$, ..., $30i_M$), so that plural downlink antenna beams are formed when signals are applied to a plurality of the beam input ports ($28i_1$, $28i_2$, ..., $28i_{140}$) of the analog beamformer (28). A receiving arrangement (12,14) receives unguided electromagnetic uplink radiation including at least one carrier, and at least transduces the unguided electromagnetic uplink radiation into guided electromagnetic energy on a plurality of separate paths ($15_a$, $15_b$, ..., $15_F$). In some contexts, the receiving arrangement (12, 14) also downconverts the signal carrier frequency to a lower frequency or to baseband. A narrowband digital channelizer (18,20; 20) has individual channels. Each of the individual channels has a bandwidth suitable for audio signals. The channelizer (18,20; 20) includes a plurality of input ports ($18i_1$, $18i_2$, ..., $18i_N$; $20i_1$, $20i_2$, ..., $20i_N$, $20i_a$, ..., $20i_o$) and a plurality of output ports ($20o_1$, $20o_2$, ..., $20o_{140}$). At least some ($18i_1$, $18i_2$, ..., $18i_N$; $20i_1$, $20i_2$, ..., $20i_N$) of the input ports ($18i_1$, $18i_2$, ..., $18i_N$; $20i_1$, $20i_2$, ..., $20i_N$, $20i_a$, ..., $20i_o$) of the digital channelizer (20) are coupled by way of corresponding ones of the plurality of separate paths ($15_a$, $15_b$, ..., $15_F$) to the receiving arrangement (12,14). The digital channelizer (20) receives the guided electromagnetic energy from a plurality of the separate paths ($15_a$, $15_b$, ..., $15_F$), and extracts each of the independent narrowband signals from the at least one carrier, to thereby produce separated independent narrowband signals on the plurality of output ports ($20o_1$, $20o_2$, ..., $20o_2$, ..., $20o_{140}$) of the digital channelizer (20). A wideband channelizer (32) has an individual channel bandwidth at least five times greater than that of an individual channel of the narrowband channelizer (20). The wideband channelizer (32) is coupled to at least a portion ($14_a$) of the receiving arrangement (12,14), for extracting at least one wideband signal from the carrier, to thereby produce separated independent wideband signals. A switching arrangement (26) is coupled to the plurality of output ports ($20o_1$, $20o_2$, ..., $20o_{140}$) of the narrowband channelizer (20) and is also coupled to the wideband channelizer (32). The switching arrangement (26) receives the independent narrowband signals and the wideband signals, and groups together those signals associated with each of the plural downlink antenna beams, to thereby produce combined signals grouped by beam. The combined signals grouped by beam may include any number of the wideband signals, including the number zero. Lastly, the spacecraft (10) also includes a coupling arrangement (27) coupled to the (output ports of the) switching arrangement (26) and to the corresponding beam input ports of the beamformer (28). This causes the beamformer and the downlink antenna to route each of the combined signals to the antenna beam for which it is destined.

A method according to another aspect of the invention is for transmitting wideband signals and at least some of a plurality of independent signals through an analog beamformer (28). Each of the independent signals has a bandwidth no greater than one-fifth of that of the wideband signals. The method includes the step of receiving (at receivers of set 14) unguided electromagnetic radiation including (a) a plurality of the independent signals having bandwidths suitable for audio use and (b) the wideband signals, to thereby produce guided electromagnetic energy signals (on set 15 of paths) representing combined wideband signals and narrowband independent channels. In one mode of this method, the plurality of independent signals is modulated onto a subcarrier (200 Khz separation in the example) which is, in turn, modulated onto a carrier (one of plural C-band carriers). The method according to the aspect of the invention further includes the steps of channelizing (20) the signals representing combined wideband signals and narrowband independent channels, to thereby extract separated independent narrowband signals, and of separately channelizing (32) the signals representing combined wideband signals and narrowband independent channels, to thereby extract separated wideband signals. Those of the separated independent narrowband signals and the separated wideband signals which are associated or destined for transmission over the same antenna beam are combined (26) so as to produce antenna beam signals. The antenna beam signals are beamformed (28) to produce plural antenna element guided wave signals which, when combined "in space" produce the desired beams. The last step of the method according to this mode of the method is to couple each of the antenna element guided wave signals to the guided wave input port of one of the antenna elements of an antenna array (30), so that each one of the antenna element receives one, and only one, of the antenna element guided wave signals. In a particularly advantageous mode of the method according to the invention, the step of channelizing the signals representing combined wideband signals and narrowband independent channels includes the step of digitally channelizing the combined wideband and narrowband independent channels. In a further advantageous mode of the inventive method, the step of channelizing includes the step of limiting the bandwidth of each of the independent signals to a bandwidth suitable for carrying of intelligible audio, which in one version is a bandwidth of less than about 10 Khz.

What is claimed is:

1. A communication spacecraft for providing cellular communications among a plurality of user terminals and ground stations, by way of paths having a bandwidth generally suited for audio signals, and for also providing communications among at least said ground stations by way of at least one path having a bandwidth at least five times greater than said bandwidth suitable for audio signals, said spacecraft comprising:
- a downlink antenna including a plurality of antenna elements, for receiving guided electromagnetic energy at each of said antenna elements, and for radiating said energy in the form of unguided radiation:
- an analog beamformer including a plurality of beam input ports and a plurality of elemental antenna ports, each of which is coupled to one of said antenna elements, for producing at least one independent beam of electromagnetic downlink radiation from guided energy applied to each of said beam input ports, so that plural downlink antenna beams are formed when signals are applied to a plurality of said beam input ports of said analog beamformer;
- receiving means for receiving unguided electromagnetic uplink radiation including at least one carrier, and for at least transducing said unguided electromagnetic uplink radiation into guided electromagnetic energy on a plurality of separate paths;
- a narrowband digital channelizer having individual channel bandwidths suitable for audio signals, said channelizer including a plurality of input ports and a plurality of output ports, at least some of said input ports of said digital channelizer being coupled by way of corresponding ones of said plurality of separate paths to said receiving means, for receiving said guided electromagnetic energy from a plurality of said separate paths, and for extracting each of said independent narrowband signals from said at least one carrier, to thereby produce separated independent narrowband signals on said plurality of output ports of said digital channelizer;
- a wideband channelizer having an individual channel bandwidth at least five times greater than that of an individual channel of said narrowband channelizer, said wideband channelizer being coupled to at least a portion of said receiving means, for extracting at least one wideband signal from said carrier, to thereby produce separated independent wideband signals;
- a switching arrangement coupled to said plurality of output ports of said narrowband channelizer and to said wideband channelizer, for receiving said independent narrowband signals and said wideband signals, and for grouping together those signals associated with each of said plural downlink antenna beams, to thereby produce combined signals grouped by beam, where said combined signals may include any number of said wideband signals, including the number zero; and
- a coupling arrangement coupled to said switching arrangement and to said beamformer, for coupling said combined signals grouped by beam to that one of said input ports of said beamformer associated with the beam of said group.

2. A communication spacecraft for providing cellular communications among a plurality of user terminals and ground stations, by way of paths having a bandwidth generally suited for audio signals, and for also providing communications among at least said ground stations by way of at least one path having a bandwidth at least five times greater than said bandwidth suitable for audio signals, said spacecraft comprising:
- an uplink antenna including a plurality of antenna elements, for receiving unguided electromagnetic energy including at least one uplink carrier at each of said antenna elements, and for transducing received unguided radiation into guided waves at a guided-wave port:
- an analog beamformer including a plurality of beam output ports and a plurality of elemental antenna ports, each of which is coupled to one of said antenna elements, for producing at least one independent uplink antenna beam signal at each of said beam output ports from guided energy applied to said elemental antenna ports, so that plural uplink antenna beam signals are formed when signals are applied to a plurality of said elemental antenna ports of said analog beamformer;
- receiving means for receiving said uplink antenna beam signals, and for at least downconverting said uplink antenna beam signals to produce downconverted uplink antenna beam signals;
- a narrowband digital channelizer having individual channel bandwidths suitable for audio signals, said channelizer including a plurality of input ports and a plurality of output ports, at least some of said input ports of said digital channelizer being coupled by way of separate paths to said receiving means, for receiving said downconverted uplink antenna beam signals, and for separately processing each of said independent narrowband signals in a manner which associates each of said independent narrowband signals with other such independent narrowband signals destined for a particular downlink antenna beam, to thereby produce independent narrowband signals combined on a beam-destination basis on said plurality of output ports of said digital channelizer;
- a wideband channelizer having an individual channel bandwidth at least five times greater than that of an individual channel of said narrowband channelizer, said wideband channelizer being coupled to at least a portion of said receiving means, for extracting at least one wideband signal from the received signal, to thereby produce separated independent wideband signals;
- a switching arrangement coupled to said plurality of output ports of said narrowband channelizer and to said wideband channelizer, for receiving said independent narrowband signals and said wideband signals, and for grouping together those signals associated with each of said plural downlink antenna beams, to thereby produce combined signals grouped by beam, where said combined signals may include any number of said wideband signals, including the number zero; and
- a coupling arrangement coupled to said switching arrangement and to said beamformer, for coupling said combined signals grouped by beam to that one of said input ports of said beamformer associated with the beam of said group.

3. An apparatus according to claim 2, wherein said downconverting means downconverts said downconverted uplink antenna beam signals to baseband.

4. An apparatus according to claim 2, wherein said narrowband digital channelizer further comprises return link upconverters associated with at least some of its output ports, for upconverting said independent narrowband signals to an intermediate frequency.

5. An apparatus according to claim 3, wherein said wideband channelizer comprises an upconverter for upconverting said downconverted uplink antenna beam signals to produce upconverted received signals.

6. An apparatus according to claim 5, wherein said wideband channelizer comprises at least one wideband filter for filtering said upconverted received signals.

7. A method for transmitting, through an analog beamformer, wideband signals and at least some of a plurality of independent signals, each of which independent signals has a bandwidth no greater than one-fifth of that of said wideband signals, said method comprising the steps of:

receiving unguided electromagnetic radiation including (a) a plurality of said independent signals having bandwidths suitable for audio use, each of said independent signals being modulated onto a subcarrier which is in turn modulated onto a carrier and (b) said wideband signals, to thereby produce guided electromagnetic energy signals representing combined wideband signals and narrowband independent channels;

channelizing said signals representing combined wideband signals and narrowband independent channels, to thereby extract separated independent narrowband signals;

channelizing said signals representing combined wideband signals and narrowband independent channels, to thereby extract separated wideband signals;

combining those of said separated independent narrowband signals and said separated wideband signals which are associated to be downlinked over a particular downlink antenna beam, to thereby produce antenna beam signals;

beamforming said antenna beam signals to produce plural antenna element guided wave signals; and coupling each of said antenna element guided wave signals to the guided wave input port of a different antenna element of an antenna array.

8. A method according to claim 7, wherein said step of channelizing said signals representing combined wideband signals and narrowband independent channels, includes the step of digitally channelizing said combined wideband and narrowband independent channels.

9. A method according to claim 7, wherein said step of channelizing includes the step of limiting the bandwidth of each of said independent signals to a bandwidth suitable for carrying of intelligible audio.

10. A method according to claim 9, wherein said step of limiting the bandwidth includes the step of limiting each of said independent signals to a bandwidth of no more than 10 KHz.

* * * * *